2 Sheets—Sheet 1.

K. E. BUNNELL & A. R. BROWN.
MILK COOLER OR WARMER.

No. 176,592. Patented April 25, 1876.

WITNESSES.
Pat. E. Oliphant
T. N. Durand

INVENTORS.
K. E. Bunnell.
A. R. Brown.
per Chas. H. Fowler
Attorney.

2 Sheets—Sheet 2.

K. E. BUNNELL & A. R. BROWN.
MILK COOLER OR WARMER.

No. 176,592. Patented April 25, 1876.

WITNESSES.
Nat. E. Oliphant,
T. D. Osmand,

INVENTORS.
K. E. Bunnell,
A. R. Brown,
per Chas. H. Fowler
Attorney.

N. PETERS, PHOTO-LITHOGRAPHER, WASHINGTON, D C.

UNITED STATES PATENT OFFICE.

KOSSUTH E. BUNNELL AND ALBERT R. BROWN, OF GUILFORD, NEW YORK.

IMPROVEMENT IN MILK COOLERS OR WARMERS.

Specification forming part of Letters Patent No. 176,592, dated April 25, 1876; application filed February 28, 1876.

*To all whom it may concern:*

Be it known that we, KOSSUTH E. BUNNELL and ALBERT R. BROWN, of Guilford, in the county of Chenango and State of New York, have invented a new and valuable Improvement in Milk-Coolers; and we do hereby declare that the following is a full, clear, and exact description of the construction and operation of the same, reference being had to the annexed drawings, making a part of this specification, and to the letters and figures of reference marked thereon.

Figure 1:
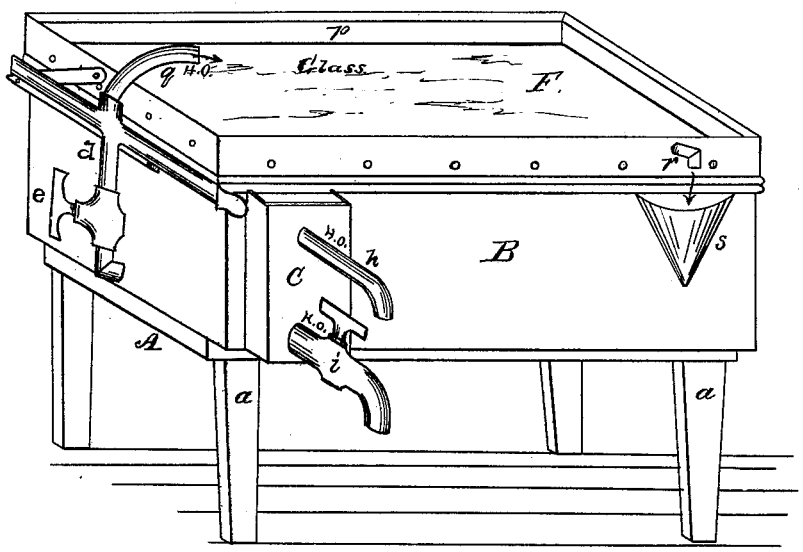
Figure 2:
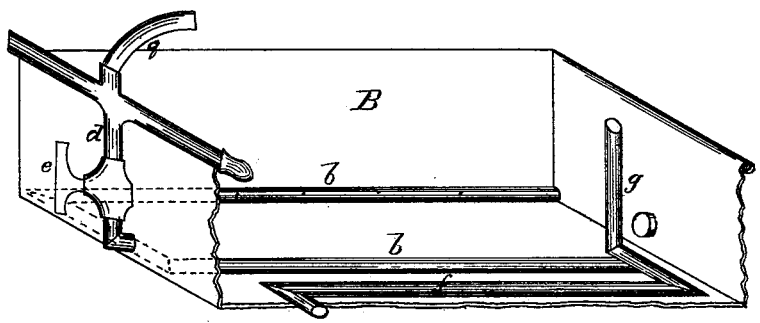
Figure 3:
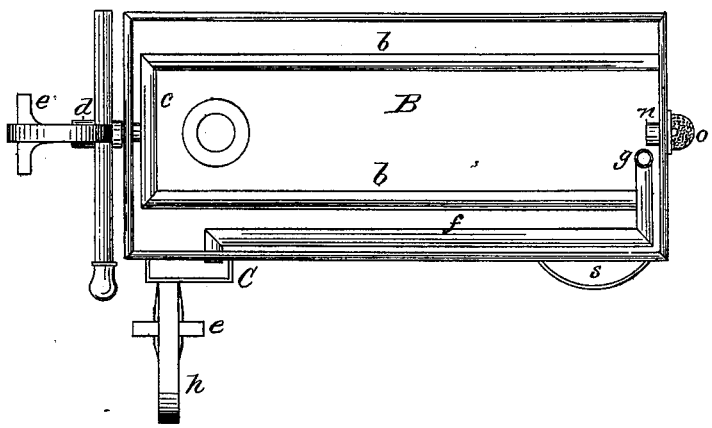
Figure 4:
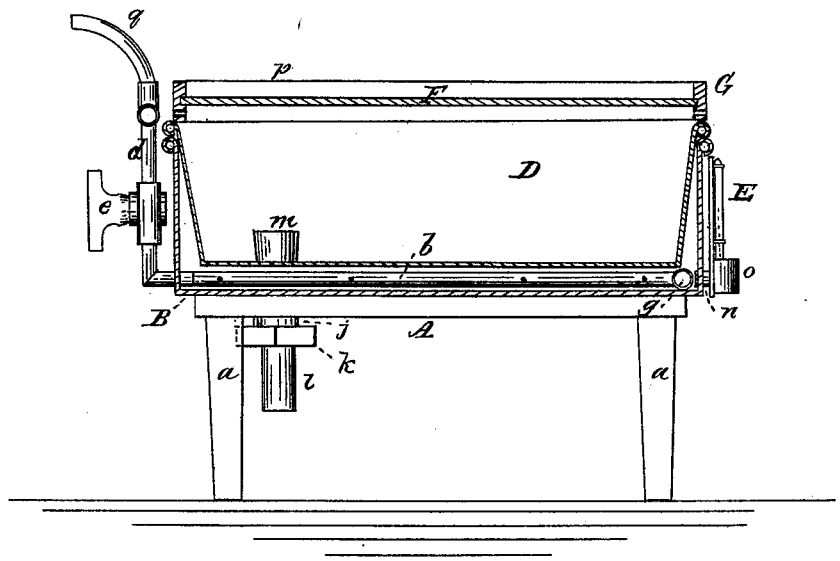

Figure 1 of the drawing is a representation of a perspective view of our invention. Fig. 2 is a perspective view taken with the side broken away, showing the pipes; Fig. 3, a plan view, with the milk-pan removed. Fig. 4 is a vertical longitudinal section.

This invention has relation to milk-coolers; and consists in the combination and arrangement of the several parts, as will be hereinafter described, and subsequently pointed out in the claims.

In the drawings, A represents a suitable stand, provided with supports or legs $a$. Upon the stand A rests the cooling vessel or tank B, at the bottom of which are horizontal pipes $b$, perforated alternately or opposite, so as to distribute the water evenly under and around the interior of said tank for the purpose of cooling the milk in the pan, and holding it to the desired temperature in warm or hot weather, and also for conducting steam or hot water into the tank B around the pan, for warming or scalding the milk in cool weather, thereby giving dairymen a milk-pan which can be used both in summer and in winter.

Communicating with the pipes $b$ through branch $c$ is a pipe, $d$, provided with a suitable faucet, $e$, for regulating the supply of water from the spring or water-tank to the pipes $b$, or for regulating the supply of hot water or steam. One end of the perforated pipe $b$ connects with a supplemental pipe, $f$, said pipe having a vertical branch, $g$, extending up at the desired distance to the top of the tank B, acting as an overflow-pipe, so that the water, which is warm by coming in contact with the milk-pan D, is taken from the top of the vessel or tank B and conducted out through the side of the tank into an exit-tube, C, and escaping through a waste-pipe, $h$. A faucet, $i$, passes through the exit-tube C into the tank B, for drawing off the water from said tank. A milk-pan, D, is secured within the tank B by a screw-threaded tube, $j$, secured to the bottom of said pan, and passing down through the tank B, and fastened by a screw-nut, $k$, said nut also coupling a tube, $l$, through which the milk passes into a proper receptacle placed under it by withdrawing a stopper, $m$. A thermometer, E, is attached to the end or sides of the cooling vessel or tank B by means of a tube, $n$, which passes through the tank, by which the water is allowed to come in contact with the mercury in the thermometer to ascertain the temperature of the water in the tank. The thermometer may be attached or detached to or from the tank by means of a screw-thread on the tube $n$, with a suitable nut or packing to prevent the leakage of water from the tank, thereby forming a water-tight joint. The ball and lower portion of the thermometer are incased in a metal casing, $o$, containing a cement of plaster-of-paris, or other suitable non-conductor of heat or cold, and for the further purpose of preventing the water, as it comes in contact with the ball containing the mercury, from running out of the vessel or tank.

Hinged or otherwise secured to the tank B is a glass cover or top, F, said cover being set in a frame, G, of wood, metal, or any other suitable material, and is perforated in its lower section under the glass, for the purpose of allowing the animal heat to escape from the milk in the pan D; and the glass cover F is used to prevent air from passing over the top of the milk, thereby preventing the cream on the milk from drying. The frame G projects above the surface of the glass cover F, forming a flange, $p$, by which the glass cover and frame combined may be used as a cooler without excluding the light from the milk in the pan, water being allowed to flow thereon through a curved pipe, $q$, communicating with the pipe from the spring or tank, the water being shut off, when desired, by a suitable faucet connected to the pipe $q$. To prevent the water from escaping over the flange $p$ of the frame G, a pipe, $r$, is connected to said frame above the cover F, through which the water is allowed to escape into a funnel, $s$, and thence into the vessel or tank B, where the water is carried off through the faucet $i$, as before described. The glass cover and frame are provided with a hinge-brace, $t$, which may be used at either or both ends, for the purpose of holding the glass cover in the desired position when thrown open. The curve pipe $q$ is provided with a joint at its base, so that it can be thrown out of its way, for the purpose of raising the glass cover F.

Having thus described our invention, what we claim as new, and desire to secure by Letters Patent, is—

1. The combination, with the perforated pipe $b\ b$, of the supplemental or branch pipe $f$ and the vertical section of pipe $g$, the latter extending up near the top of the cooling chamber or vessel B, for the purpose of drawing off the water from the top of the vessel as it becomes warmed by coming in contact with the bottom and sides of the pan D containing the milk, substantially as and for the purpose specified.

2. In combination with the milk-cooler, a thermometer having its lower portion surrounded in a casing, $o$, filled with a non-conductor, and connected to the vessel B by a pipe or tube, $n$, to allow the water to come in contact with the ball containing the mercury, substantially as and for the purpose described.

3. In a milk-cooler, the glass cover F, with frame G and flange $p$, in combination with the pipe $q$, substantially as and for the purpose set forth.

4. The glass cover F, frame G, with flange $p$, pipe $r$, and the pipe $q$, in combination with the vessel B and the funnel $s$, substantially as and for the purpose specified.

In testimony that we claim the above we have hereunto subscribed our names in the presence of two witnesses.

KOSSUTH E. BUNNELL.
ALBERT R. BROWN.

Witnesses:
PHILO STEBBINS,
JACOB A. HAYNES.